United States Patent
Kim

(10) Patent No.: US 10,855,130 B2
(45) Date of Patent: Dec. 1, 2020

(54) TERMINAL ASSEMBLY AND MOTOR CONTAINING SAME

(71) Applicant: LG INNOTEK CO., LTD., Seoul (KR)

(72) Inventor: Byeong Yong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 496 days.

(21) Appl. No.: 15/562,224

(22) PCT Filed: Mar. 24, 2016

(86) PCT No.: PCT/KR2016/002971
§ 371 (c)(1),
(2) Date: Sep. 27, 2017

(87) PCT Pub. No.: WO2016/167488
PCT Pub. Date: Oct. 20, 2016

(65) Prior Publication Data
US 2018/0123414 A1    May 3, 2018

(30) Foreign Application Priority Data

Apr. 15, 2015   (KR) .................... 10-2015-0053311

(51) Int. Cl.
*H02K 3/18*     (2006.01)
*H02K 3/28*     (2006.01)
(Continued)

(52) U.S. Cl.
CPC ............ *H02K 3/28* (2013.01); *H02K 3/18* (2013.01); *H02K 3/522* (2013.01); *H02K 5/225* (2013.01); *H02K 2203/09* (2013.01)

(58) Field of Classification Search
CPC .. H02K 3/18; H02K 3/28; H02K 3/50; H02K 3/505; H02K 3/522; H02K 5/22;
(Continued)

(56) References Cited

FOREIGN PATENT DOCUMENTS

| CN | 1860662 A | 11/2006 |
|---|---|---|
| CN | 104253510 A | 12/2014 |

(Continued)

OTHER PUBLICATIONS

International Search Report in International Application No. PCT/KR2016/002971, filed Mar. 24, 2016.
(Continued)

*Primary Examiner* — Shawki S Ismail
*Assistant Examiner* — Monica Mata
(74) *Attorney, Agent, or Firm* — Saliwanchik, Lloyd & Eisenschenk

(57) ABSTRACT

The present embodiment relates to a terminal assembly comprising: a power supply terminal module, which comprises a power supply terminal and a support part, the power supply terminal including a body part and an insertion part bent and extended from an end of the body part and the support part being coupled to the power supply terminal so as for the body part to penetrate therethrough; and a bus bar terminal module, which comprises a bus bar guide groove, in which the insertion part is inserted, and a bus bar terminal, which is placed in the bus bar guide groove and is in contact with the insertion part.

20 Claims, 8 Drawing Sheets

(a)             (b)             (c)

(51) Int. Cl.
*H02K 5/22* (2006.01)
*H02K 3/52* (2006.01)

(58) Field of Classification Search
CPC ........ H02K 5/225; H02K 11/30; H02K 11/35; H02K 2203/09
USPC ......................................................... 310/71
See application file for complete search history.

(56) References Cited

FOREIGN PATENT DOCUMENTS

| | | |
|---|---|---|
| JP | 2003-134724 A | 5/2003 |
| JP | 2008-061429 A | 3/2008 |
| JP | 2010-200575 A | 9/2010 |
| JP | 2012-170172 A | 9/2012 |
| JP | 2013-222586 A | 10/2013 |
| JP | 2014-82898 A | 5/2014 |
| JP | 2014082898 A * | 5/2014 |
| KR | 10-2013-0061283 A | 6/2013 |
| WO | WO-2014/196096 A1 | 12/2014 |

OTHER PUBLICATIONS

Office Action dated Mar. 21, 2019 in Chinese Application No. 201680022274.8.
Office Action dated Feb. 25, 2020 in Japanese Application No. 2017-552043.

\* cited by examiner

PRIOR ART

TERMINAL ASSEMBLY AND MOTOR CONTAINING SAME

CROSS-REFERENCE TO RELATED APPLICATIONS

This application is the U.S. national stage application of International Patent Application No. PCT/KR2016/002971, filed Mar. 24, 2016, which claims priority to Korean Application No. 10-2015-0053311, filed Apr. 15, 2015, the disclosures of each of which are incorporated herein by reference in their entirety.

TECHNICAL FIELD

The teachings in accordance with the exemplary embodiments of this invention relate generally to a terminal assembly for motor and a motor using the same.

BACKGROUND ART

In general, an external look of a motor is formed by coupling of a housing and a cover member, and the housing is provided at an inner surface with a stator, and the stator is provided at a center with a rotor rotatably installed according to an electrical interaction with the stator. The rotor is rotatably supported by a rotation shaft, where an upper surface of the rotation shaft is coupled with elements that require various driving forces. For example, a steering shaft of a vehicle is connected to provide a power assisting the steering as mentioned above. In the stator of an EPS (Electrically Power Steering) motor thus configured, a power is supplied to a wound coil through a bus bar.

In an exemplary case of a BLDC (BrushLess DC) motor forming an Electric Power Steering System of a vehicle, the rotation shaft is connected at an upper surface with a steering axle to supply a power assisting the steering as mentioned above. The stator of an EPS motor thus configured is such that a power is supplied to a wound coil through a bus bar.

The stator is generally formed with a core and a coil wound on the core, and the motor generally used on a vehicle is such that a plurality of coils is connected in parallel in order to reduce a loss caused by coil resistance. Thus, the coils are extended up to input/output terminals at the time of parallel connection, where coils are connected to the terminals.

In order to connect the parallel-arranged coils to the terminals, the stator is coupled at an upper surface with an assembly, so-called a bus bar, formed with a plurality of terminals, and in order to couple the bus bars, the stator is arranged at an upper side with respective coil terminals of wound coils, where the bus bars are connected to the coil terminals.

Particularly, a power supply terminal supplying a power to the motor is coupled to the abovementioned bus bar, where, in the case of conventional power supply terminal, the power supply terminal and a terminal of the bus bar are pressed and coupled through a welding process. However, this process makes it impossible for automation process to be implemented, and there arises a problem in mounting alignment at accurate points.

DISCLOSURE

Technical Problem

The exemplary embodiments of the present invention are directed to solve the aforementioned problems, disadvantages or shortcomings, and particularly, a structure is so implemented that a power supply terminal can be electrically connected by coupling with the terminal using an insertion coupling instead of welding, the power supply terminal is guided inside a terminal module of a bus bar for easy alignment, and a fixture hanging pattern forming a fixing power is implemented lest separation occurs after coupling to thereby build a reliability.

Technical Solution

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a terminal assembly, comprising:

a power supply terminal module including a body part, a power supply terminal including an insertion part bent and extended from an end of the body part, and a support part being coupled to the power supply terminal so as for the body part to penetrate therethrough; and a bus bar terminal module including a bus bar guide groove inserted by the insertion part and a bus bar terminal, which is placed in the bus bar guide groove and is in contact with the insertion part.

The present invention may be embodied by a motor which applies the abovementioned terminal assembly, and comprises: a motor housing; a stator disposed at an inside of the motor housing to include a stator core and a coil wound on the stator core; and a rotor rotatably disposed at a center of the stator.

A terminal assembly according to an exemplary embodiment of the present invention may comprise: a power supply terminal module including a body part, a power supply terminal including an insertion part bent and extended from an end of the body part, and a support part being coupled to the power supply terminal so as for the body part to penetrate therethrough; and a bus bar terminal module including a bus bar guide groove inserted by the insertion part and a bus bar terminal, which is placed in the bus bar guide groove and is in contact with the insertion part.

Preferably, but not necessarily, the insertion part may include a first extension part slantly extended from the body part, and a second extension part slantly extended from the first extension part.

Preferably, but not necessarily, the first extension part may be vertically extended from the body part, and the second extension part may be vertically extended from the first extension part.

Preferably, but not necessarily, the insertion part may include a contact part protrusively formed on the second extension part to contact the bus bar terminal.

Preferably, but not necessarily, the insertion part may include a ring part extended from an end of the second extension part, and the ring part may be so formed as to have an acute angle with the second extension part.

Preferably, but not necessarily, the bus bar guide groove may include a fixture hanging pattern having a shape corresponding to that of the ring part and accommodating at least a part of the ring part.

Preferably, but not necessarily, the fixture hanging pattern may be narrowed in width while being extended to a direction inserted by the ring part.

Preferably, but not necessarily, the bus bar terminal may include a first terminal part surface-contacting an inner surface of the bus bar guide groove, and a second terminal part exposed to an outside by being bent from the first terminal part.

Preferably, but not necessarily, the first extension part may be in contact with the second terminal part and the second extension part may be in contact with the first terminal part.

Preferably, but not necessarily, the power supply terminal may include first, second and third power supply terminals, each being spaced apart at a predetermined distance.

In another general aspect of the present invention, there is provided a motor, comprising:

a motor housing;

a stator disposed at an inside of the motor housing to include a stator core and a coil wound on the stator core;

a rotor rotatably disposed at a center of the stator; and a terminal assembly disposed at an upper side of the stator to be electrically connected to the coil, wherein the terminal assembly may comprise:

a power supply terminal module, which comprises a power supply terminal and a support part, the power supply terminal including a body part and an insertion part bent and extended from an end of the body part and the support part being coupled to the power supply terminal so as for the body part to penetrate therethrough; and a bus bar terminal module, which comprises a bus bar guide groove, in which the insertion part is inserted, and a bus bar terminal, which is placed in the bus bar guide groove and is in contact with the insertion part.

Advantageous Effects

The exemplary embodiments of the present invention are to advantageously provide a terminal assembly for motor with a more reliable structure where the structure is so implemented that a power supply terminal can be electrically connected by coupling with the terminal using an insertion coupling instead of welding, the power supply terminal is guided inside a terminal module of a bus bar for easy alignment, and a fixture hanging pattern embodying a fixing power is implemented lest separation occurs after coupling to thereby build a reliability, and a motor using the terminal assembly.

DESCRIPTION OF DRAWINGS

The teachings of the present invention can be readily understood by considering the following detailed description in conjunction with the accompanying drawings, in which.

BEST MODE

Figure 1:
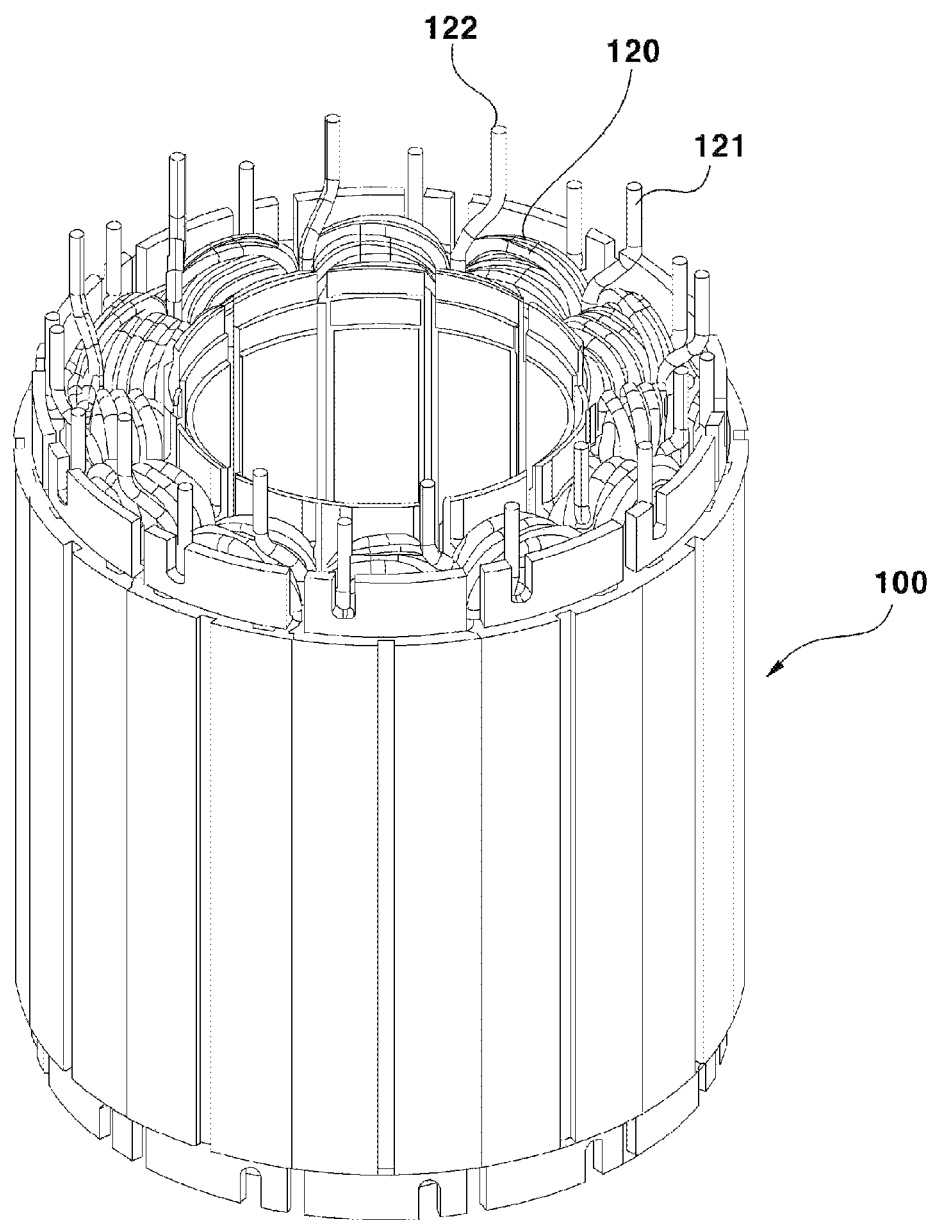
FIG. 1 illustrates a structure of a stator mounted with a terminal assembly according to an exemplary embodiment of the present invention.

Now, configurations and operations according to exemplary embodiments of the present invention will be described in detail with reference to the accompanying drawings. Throughout the descriptions, the same reference numerals will be assigned to the same elements in the explanations of the figures, and explanations that duplicate one another will be omitted. Furthermore, the terms "first", "second," "A", "B", (a), (b) and the like, herein do not denote any order, quantity, or importance, but rather are used to distinguish one element from another.

Figure 2:
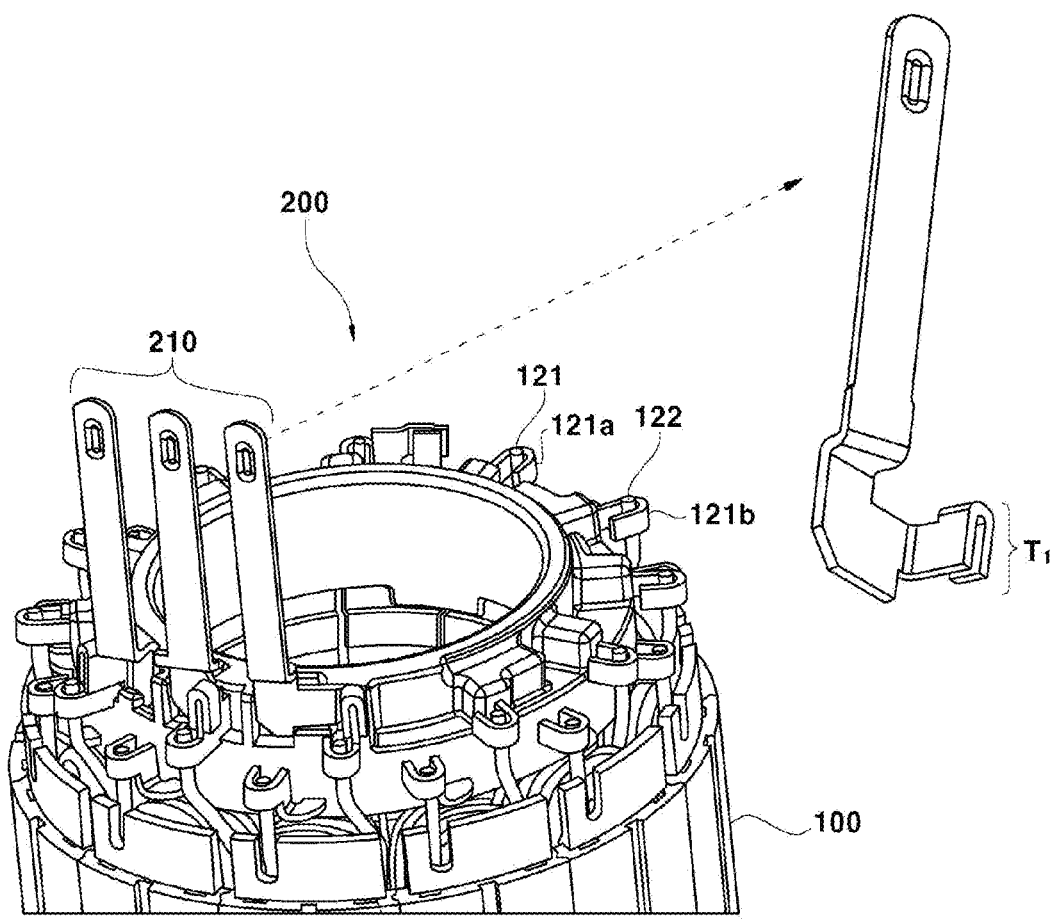
FIG. 2 is a coupling structure of terminal assembly according to prior art.

FIG. 1 illustrates a structure of a stator mounted with a terminal assembly (200) according to an exemplary embodiment of the present invention, and FIG. 2 is a coupling structure of terminal assembly according to prior art.

Referring to FIG. 1, the terminal assembly has a structure mounted at an upper surface of a stator, as shown in FIG. 1, according to an exemplary embodiment of the present invention. The stator (100) may be so structured as to have a stator core having a plurality of teeth protrusively formed at an inner surface toward a center, where the stator core is coupled in a plural structure. The stator tooth may be wound with a coil (120). Furthermore, the end (121, 122) of the wound coil (120) is protruded to an outside as shown in FIG. 1, which is in turn coupled to a terminal of a device where an outside power supply is later implemented.

Figure 5:
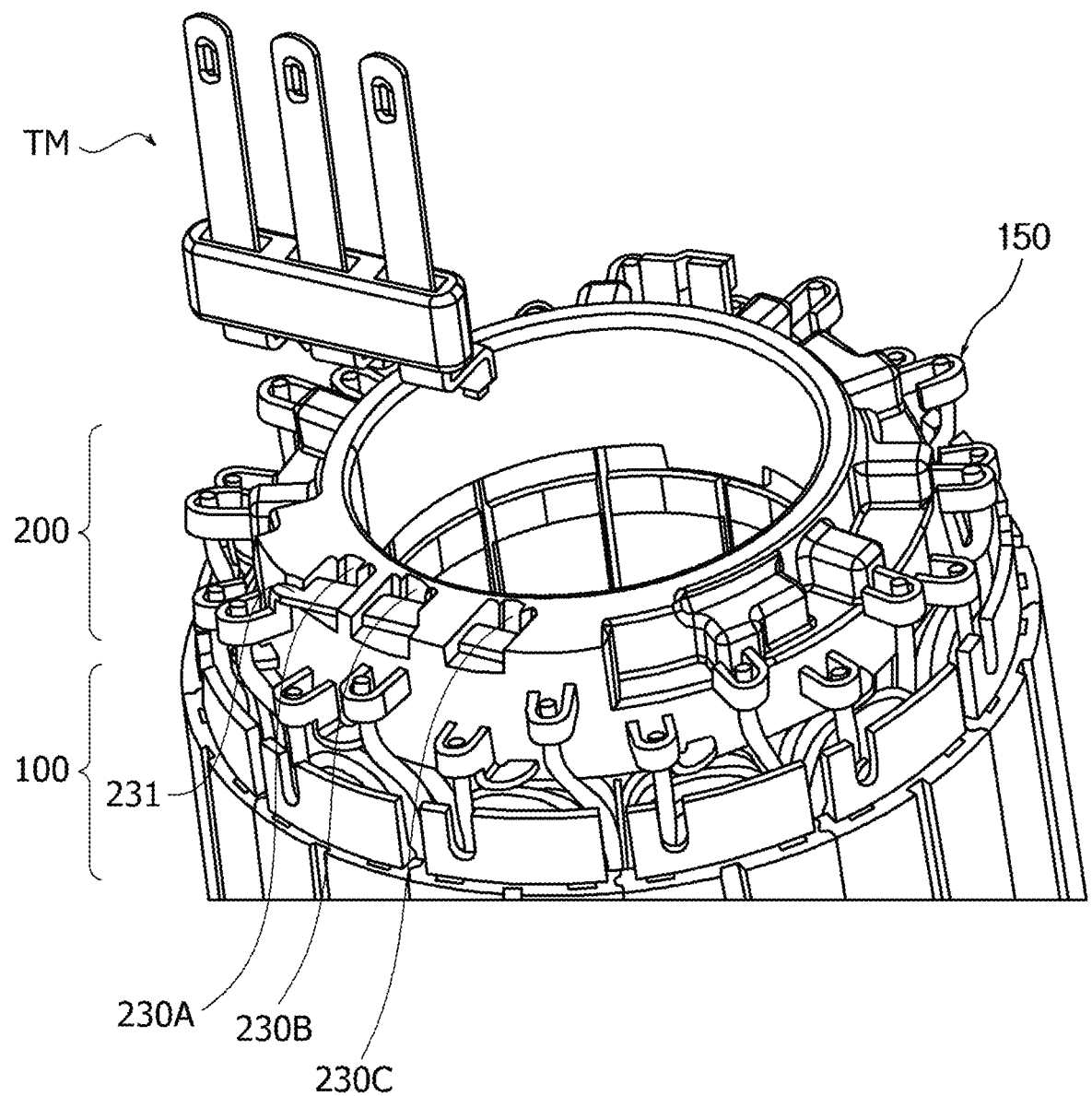
FIGS. 5 and 6 are conceptual views illustrating a coupled structure of a power supply terminal module mounted on a terminal assembly according to an exemplary embodiment of the present invention.

As illustrated in FIGS. 2 and 5, the terminal assembly (200) according to an exemplary embodiment of the present invention may be defined as a structure arranged at an upper surface of the stator (100) to guide the end (121, 122) of the coil discussed through FIG. 1 and to thereby be connected to an outside power supply device.

Referring to FIG. 2, in general, the terminal assembly (200) may include a plurality of terminal parts (121a, 121b) coupled by end (121, 122) of coil (120) extended from the stator (100) to an outside, and a power supply terminal (210), which is a terminal supplying the outside power to the plurality of terminal parts (121a, 121b), is coupled. In this case, an end (T1) of the power supply terminal (210) may be disposed with a slot inserted by the terminal parts (121a, 121b), where the slot is press-fitted by the terminal parts (121a, 121b) of FIG. 2, and the coupling process is pursued through welding. Here, when the manufacturing process is delayed, a coupling deviation can be generated where an accurate alignment is not implemented.

Figure 3:
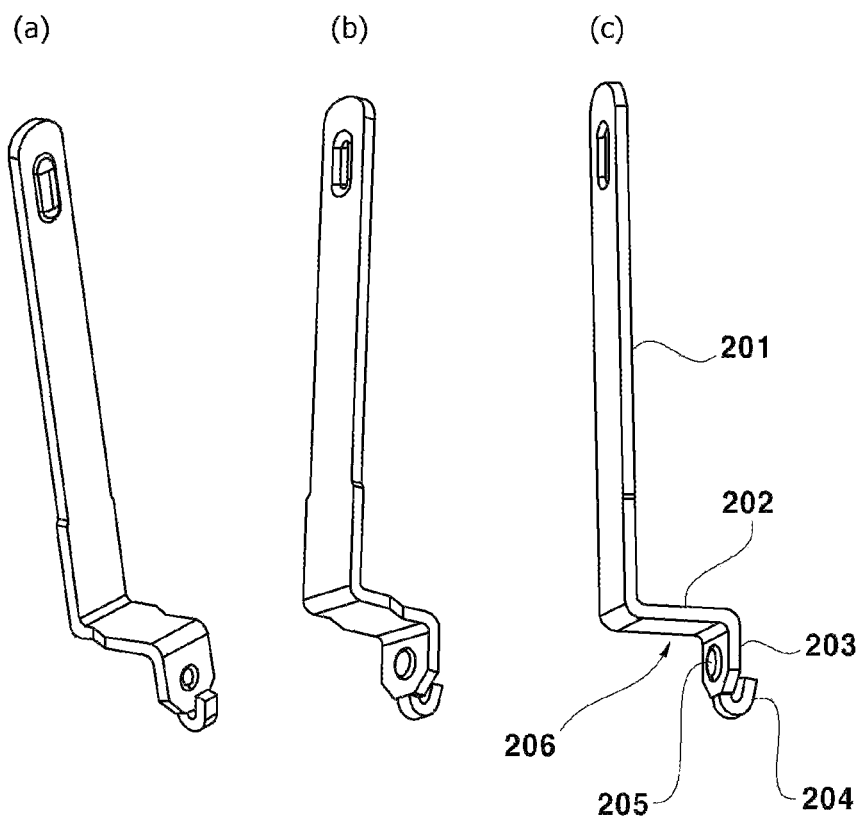
FIGS. 3 and 4 are conceptual views illustrating a structure of a power supply terminal module mounted on a terminal assembly according to an exemplary embodiment of the present invention.
Figure 4:
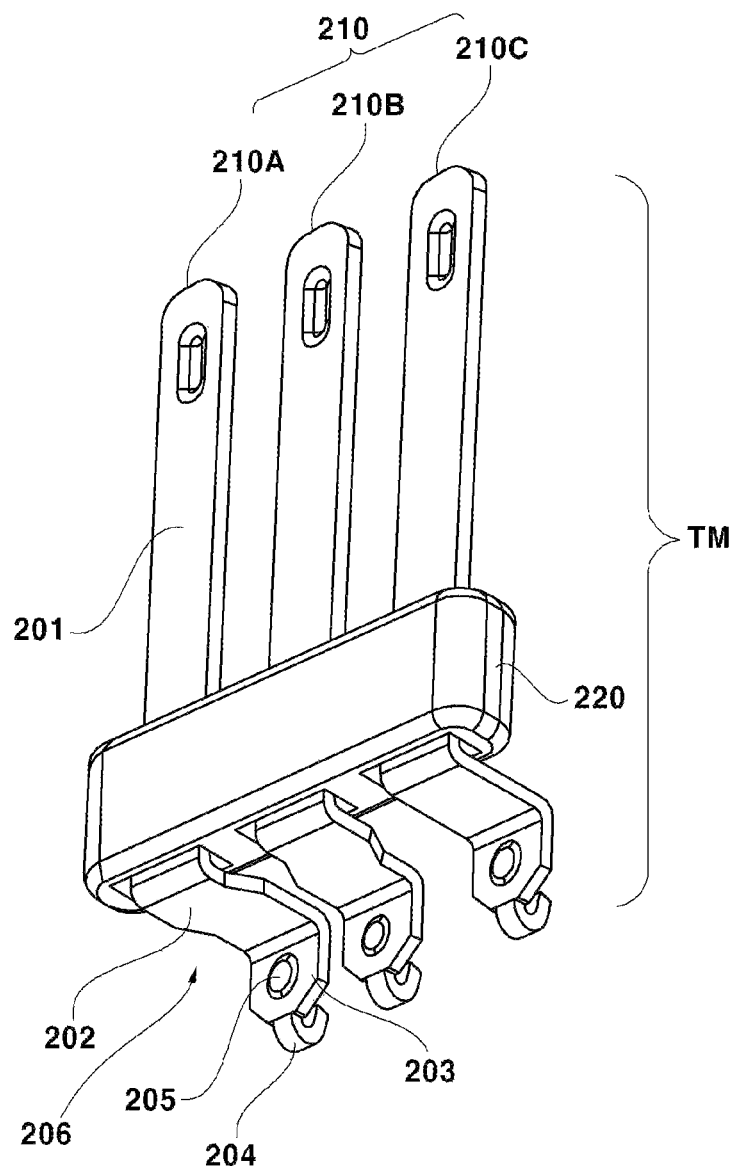

In order to solve the abovementioned problem, the terminal assembly according to an exemplary embodiment of the present invention is such that a structure of the power supply terminal (210) is changed like a structure illustrated in FIG. 3, and a power supply terminal module (TM) can be provided by coupling with a support part (220) forming the power supply terminal in a module shape as illustrated in FIG. 4.

FIGS. 3 and 4 are conceptual views illustrating a structure of a power supply terminal module mounted on a terminal assembly according to an exemplary embodiment of the present invention.

Referring to FIGS. 3 and 4, the power supply terminal (TM) according to an exemplary embodiment of the present invention may include a power supply terminal (210) including a body part (201) and an insertion part (206) bent and extended from an end of the body part (201), and a support part (220) being coupled to the power supply terminal (210) so as for the body part (201) to penetrate therethrough. In the exemplary embodiment of the present invention, the power supply terminal (210) may be implemented by first, second and third power supply terminals (201A, 210B, 210C) to allow being supplied with a 3-phase power, and one of the three power supply terminals (201A, 210B, 210C) is to be used to explain the structure.

The power supply terminal (210) may be formed at an end of a bent insertion part (206) with a ring part (204) bent outside of the body part (201). That is, the bent insertion part (206) may be formed by a structure including a first extension part (202) bent at an end of the body part (201) and a second extension part (203) re-bent by being extended from the first extension part (202), as illustrated in FIG. 3. The ring part (204) may take a shape of being bent from an end of the second extension part (203) to an outside direction in a "U" type ring shape, which may be coupled to a fixture hanging pattern (240) of a bus bar terminal module 150 (described later). The bent insertion part (206) may be formed at a surface of the bent insertion part (206), which is an opposite direction of a direction formed with the ring part (204), with a protruding contact part (205) that is in contact with a bus bar terminal (231, described later). The protruding contact part (205), when coupled by being inserted, may serve to facilitate an electrical contact of the bent insertion part (206) with the surface of the bus bar terminal (231) to thereby prevent in advance a coupling error caused by a fine insertion deviation from occurring.

Figure 6:
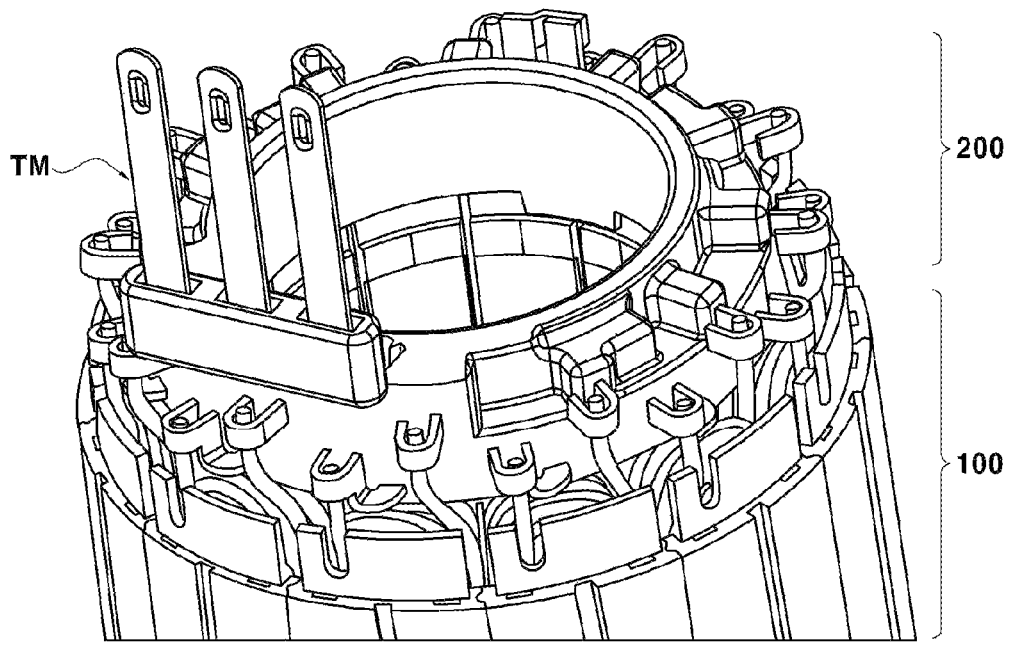

FIGS. 5 and 6 are conceptual views illustrating a coupled structure of a power supply terminal module (TM) mounted on a terminal assembly (200) according to an exemplary embodiment of the present invention. As elaborated supra, the terminal assembly (200) is so structured as to be arranged at an upper surface of the stator (100).

Referring to FIGS. 5 and 6, the power supply terminal module (TM) may be formed in a state of the power supply terminal (210) being coupled to the support part (220), and may be formed in a structure of each bent insertion part (206) being inserted and coupled to a bus bar guide groove (230A, 230B, 230C) provided at the terminal assembly (200) (See FIG. 6). This coupled structure can be in contact with the bus bar terminal (231) within the terminal assembly (200) only by an insertion coupling method, unlike a method of relying on welding. Each of the bus bar guide grooves (230A, 230B, 230C) is provided at a predetermined place of the terminal assembly (200), and the number of bus bar guide grooves (230A, 230B, 230C) may be embodied in a corresponding number to that of the power supply terminals (210) coupled to the power supply terminal module (TM). Now, the coupled structure thus discussed will be described in detail through FIG. 7.

Figure 7:
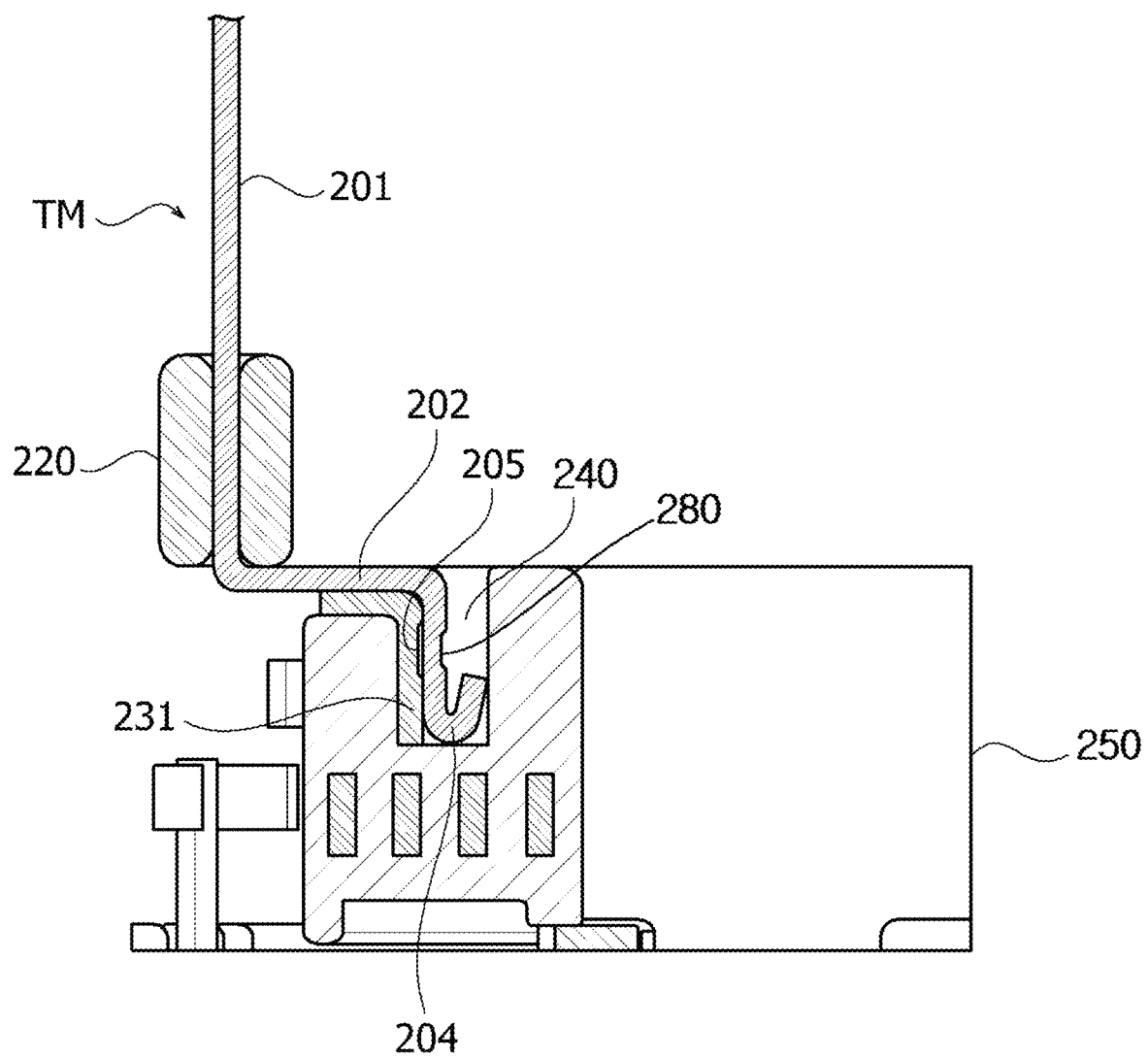
FIG. 7 is a cross-sectional conceptual view of a core part in a coupling structure of a power supply terminal module mounted on a terminal assembly according to an exemplary embodiment of the present invention.

Referring to FIGS. 5 and 7, the power supply terminals (210) coupled to the power supply terminal module (TM) may be such that a portion of the bent insertion part (206) exposed downwards of the support part (220) is inserted into an inside of the bus bar guide grooves (230A, 230B, 230C).

In this case, the bent insertion part (206) may be electrically connected by being in contact at one surface with the bus bar terminal (231) arranged at an inside of the bus bar guide grooves (230A, 230B, 230C). Particularly, the protruding contact part (205) disposed at an end of the bent insertion part (206) can be easy in being contact with a surface of the bus bar terminal (231) and as a result, the reliability can be enhanced by removing a coupling error caused by contact deviation.

Furthermore, the fixture hanging pattern (240) coupled by the ring part (204) disposed at the end of the bent insertion part (206) may be provided at the inside of the bus bar guide grooves (230A, 230B, 230C). The fixture hanging pattern (240) may be formed in a protruding structure protruded from an inner wall of the bus bar guide grooves (230A, 230B, 230C). That is, as illustrated in FIG. 7, the fixture hanging pattern (240) may have a structure of being gradually protruded from an upper surface of an inner wall of the bus bar guide grooves (230A, 230B, 230C) to a bottom surface of the inner wall, and an end portion thereof may be formed in a ring pattern of a structure inserted into an inner side of the ring part (204). Thus, the fixture hanging pattern (240) may be provided at a wall of one side inside of the bus bar guide grooves (230A, 230B, 230C) and disposed in a tapered-off structure of sequentially narrowing a width of the bus bar guide grooves (230A, 230B, 230C), whereby the press-fitting force can be evenly distributed at the time of insertion assembly to allow an easy insertion, and to prevent the bent insertion part (206) from being deviated after coupling.

Furthermore, the bus bar terminal (231) may have a structure where the bus bar guide grooves (230A, 230B, 230C) is exposed at one end to an upper surface, and tightly attached at the other end extended from the said one end to an inner wall of the bus bar guide grooves (230A, 230B, 230C) to thereby broaden (enlarge) a coupling area with the bent insertion part (206) of the power supply terminal (210), whereby an error caused by an electrical short-circuit can be prevented.

Thus, the terminal assembly (200) according to an exemplary embodiment of the present invention can promote the efficiency of manufacturing process and simultaneously enhance the convenience and accuracy of process to enable the process automation by implementing to mount the power supply terminal in an easy insertion structure, instead of coupling method using a welding.

Figure 8:
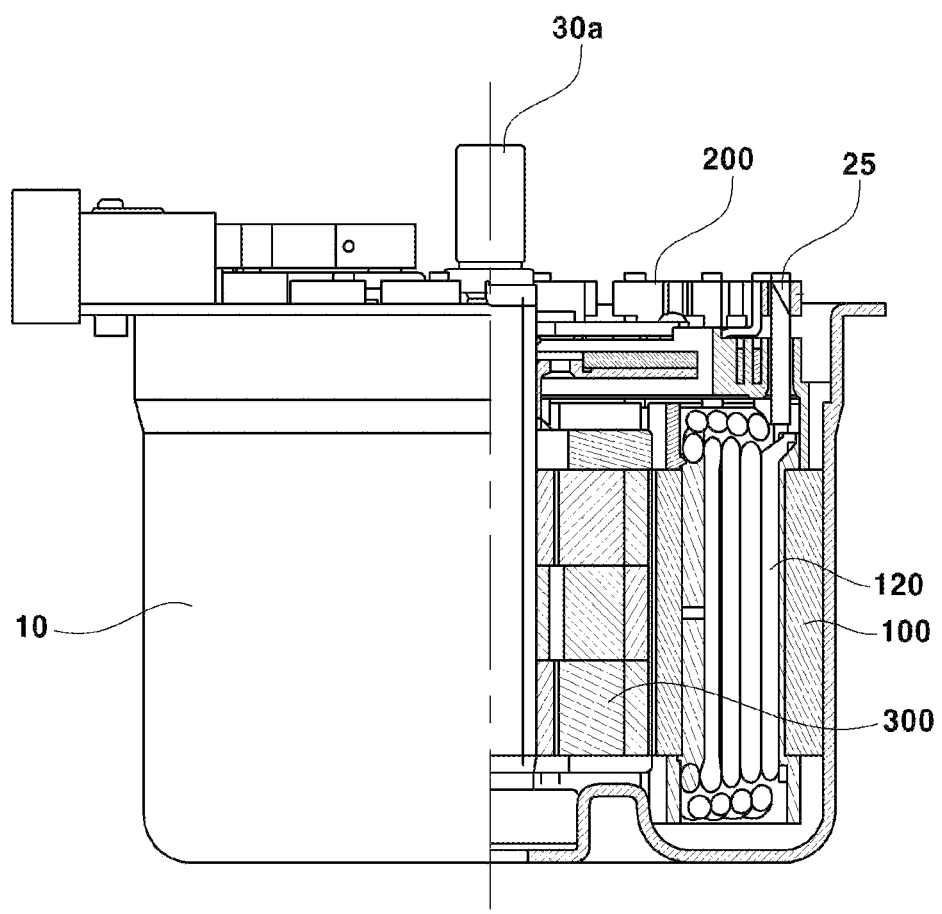
FIG. 8 is a schematic view illustrating an example of a motor applied with a terminal assembly of the present invention.

FIG. 8 is a schematic view illustrating an example of a motor applied with a terminal assembly of the present invention. Hereinafter, an implemented example of an EPS (Electrically Power Steering) motor applied with a motor router according to an exemplary embodiment of the present invention will be described with reference to FIG. 8.

However, it should be apparent that the motor router according to the exemplary embodiment can be applied to various motors. An EPS motor will be described through exemplification.

The EPS motor applied with the terminal assembly (200) according to an exemplary embodiment of the present invention may include a motor housing (10), a stator (100) and a rotor (300), and further include a terminal assembly (200) in order to supply a power to a coil (120) wound on the stator (100). In this case, it should be apparent that the terminal assembly (200) may be applied with structures of various exemplary embodiments of the present invention thus discussed above.

The motor housing (10) may be provided in a substantially cylindrical shape with an opening at an upper surface and with a bottom surface being closed. The motor housing (10) may be formed at an inside with a stator (100), a rotor (300) and a rotation shaft (30a) rotatably supporting the rotor (300). The stator (100) may include a stator core (110), a coil (120) and a coil terminal part (25) coupled to a terminal at the coil (120). The stator core (110) may be provided with a plurality of teeth (stator teeth), and the coil (120) may be provided to be wound on a periphery of the teeth using an insulator.

In addition, the stator (100) may be assembled at an upper surface with a terminal assembly (200) according to the exemplary embodiment of the present invention in order to supply a power to the coil (120). The rotor (300) may be rotatably installed at a center of the stator (100) and may be mounted with a plurality of magnets in a structure of being inserted into a periphery or an inside of the rotor core. The rotation shaft (30a) may be coaxially installed with the rotor (300) where one end may be rotatably supported by a bottom bearing mounted at a floor surface of the motor housing (10) and the other end may be supported by an upper side bearing installed at a cover member (not shown). In the above structures, a magnetic field generated from the stator and a magnetic field generated by the rotor are interacted to rotate the rotation shaft.

The terminal assembly (200) according to an exemplary embodiment of the present invention may comprise a power supply terminal module (TM) including a body part (201), a power supply terminal (210) including an insertion part (206) bent and extended from an end of the body part (201), and a support part (220) being coupled to the power supply terminal (210) so as for the body part (201) to penetrate therethrough. The terminal assembly (200) according to an exemplary embodiment of the present invention may comprise bus bar guide grooves (230A, 230B, 230C), each inserted by the insertion part (206), and a bus bar terminal module 150 including a bus bar terminal (231) arranged at the bus bar guide grooves (230A, 230B, 230C) to contact the insertion part (206). At this time, the bus bar guide grooves (230A, 230B, 230C) may be formed in a manner caved into a main body (250) of the terminal assembly (200).

The insertion part (206) may include a first extension part (202) slantly extended from the body part (201), and a second extension part (203) slantly extended from the first extension part (202). The first extension part may be vertically extended from the body part (201) and the second extension part (203) may be vertically extended from the first extension part (202).

The insertion part (206) may include a contact part (205) protrusively formed on the second extension part (203) to contact the bus bar terminal (231). The insertion part (206) may include a ring part (204) extended from an end of the second extension part (203), and the ring part (204) may be so formed as to have an acute angle with the second extension part (202).

The bus bar guide grooves (230A, 230B, 230C) may include a fixture hanging pattern (250) which has a shape corresponding to that of the ring part (204) and accommodates at least a part of the ring part. The fixture hanging pattern may be narrowed in width, while being extended to a direction inserted by the ring part (204).

The bus bar terminal (231) may include a first terminal part surface-contacting an inner surface of the bus bar guide grooves (230A, 230B, 230C), and a second terminal part exposed to an outside by being bent from the first terminal part. The first extension part (202) may be in contact with the second terminal part and the second extension part (203) may be in contact with the first terminal part. The bus bar terminal (231) includes on a surface opposite to an area formed with the contact part (205), a concave part (280) concavely formed from the opposite surface in response to an arranged area of the contact part (205).

The power supply terminal (210) may include first, second and third power supply terminals (210A, 210B, 210C), each spaced apart at a predetermined distance.

The motor according to an exemplary embodiment of the present invention may comprise: a motor housing (10); a stator (100) disposed at an inside of the motor housing (10) to include a stator core and a coil (120) wound on the stator core; a rotor (300) rotatably disposed at a center of the stator (100); and a terminal assembly (200) disposed at an upper side of the stator (100) to be electrically connected to the coil (120).

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The invention claimed is:

1. A terminal assembly, comprising:
a terminal module including a body part, an insertion part extended from an end of the body part by being bent from the end of the body part, and a support part coupled to the terminal module so as for the body part to penetrate therethrough; and
a bus bar terminal module including a guide groove receiving the insertion part, and a bus bar terminal arranged within the guide groove to be in contact with the insertion part;
wherein the insertion part comprises a hook part having a "U" type hook shape on a first surface of the insertion part and a contact part protrusively formed on a second surface of the insertion part opposite to the first surface.

2. The terminal assembly of claim 1, wherein the insertion part includes a first extension part extended from the body part, and a second extension part extended from the first extension part.

3. The terminal assembly of claim 2, wherein an end of the bus bar terminal is exposed upwards of the bus bar terminal module, and the bus bar terminal is simultaneously in contact with a surface of the first extension part and a surface of the second extension part.

4. The terminal assembly of claim 2, wherein the first extension part is vertically bent from the body part and the second extension part is vertically bent from the first extension part.

5. The terminal assembly of claim 2, wherein the second extension part includes, on the second surface of the insertion part opposite to the bus bar terminal, the contact part protrusively formed on a periphery of the second extension part to contact the bus bar terminal.

6. The terminal assembly of claim 5, wherein the bus bar terminal includes, on a surface opposite to an area formed with the contact part, a concave part concavely formed from the opposite surface corresponding to an arranged area of the contact part.

7. The terminal assembly of claim 2, wherein the insertion part includes the hook part extended from an end of the second extension part, and the hook part is so formed as to have an acute angle with respect to the second extension part at least at some parts.

8. The terminal assembly of claim 7, wherein the guide groove includes a fixture hanging pattern taking a shape corresponding to that of the hook part viewed from an upper side and accommodating at least a part of the hook part.

9. The terminal assembly of claim 7, wherein the fixture hanging pattern is narrowed in width while being extended in a direction receiving the hook part.

10. The terminal assembly of claim 2, wherein the bus bar terminal includes a first terminal part surface-contacting an inner surface of the guide groove, and a second terminal part exposed to an outside by being extended and bent from the first terminal part.

11. The terminal assembly of claim 10, wherein the first extension part is in contact, at a bottom surface, with an upper surface of the second terminal part and the second extension part is in contact with the first terminal part.

12. The terminal assembly of claim 1, wherein the terminal module includes first, second, and third terminal modules, spaced apart from each other at a predetermined distance.

13. The terminal assembly of claim 1, wherein the terminal module includes a support part coupled by each body part of the first, second, and third terminal modules.

14. The terminal assembly of claim 1, wherein an end of the insertion part is in contact with a floor surface of the guide groove.

15. The terminal assembly of claim 2, wherein the body part and the second extension part are arranged in parallel.

16. A terminal assembly, comprising:
a terminal module including a body part and an insertion part extended and bent from an end of the body part, and a support part coupled to the terminal module to allow the body part to pass therethrough; and
a bus bar terminal module including a guide groove receiving the insertion part and a bus bar terminal arranged at the guide groove to contact the insertion part,
wherein the bus bar terminal includes one end exposed upwards of the bus bar terminal module and the other end accommodated into an inside surface of the guide groove,
wherein the insertion part includes a first extension part contacting one end of the bus bar terminal and a second extension part contacting the other end of the bus bar terminal, and
wherein the insertion part comprises a hook part having a type hook shape on a first surface of the insertion part and a contact part protrusively formed on a second surface of the insertion part opposite to the first surface.

17. The terminal assembly of claim 16, wherein the insertion part includes the hook part extended from a distal end of the second extension part, and a cross-section of the hook part has a "U" shape.

18. The terminal assembly of claim 17, wherein the hook part is so formed as to have an acute angle with respect to the second extension part.

19. The terminal assembly of claim 18, wherein the guide groove includes a fixture hanging pattern taking a shape corresponding to that of the hook part and accommodating at least a part of the hook part, and the fixture hanging pattern is narrowed in width while being extended in a direction receiving the hook part.

20. A motor, comprising:
a motor housing;
a stator disposed at an inside of the motor housing to include a stator core and a coil wound on the stator core;
a rotor rotatably disposed at a center of the stator; and
a terminal assembly disposed at an upper side of the stator to be electrically connected to the coil, wherein
the terminal assembly comprises:
a terminal module including a terminal module including a body part and an insertion part bent and extended from an end of the body part, and a support part being coupled to the terminal module to allow the body part to pass therethrough; and
a bus bar terminal module including a guide groove receiving the insertion part and a bus bar terminal disposed at the guide groove to contact the insertion part, and
wherein the insertion part comprises a hook part having a "U" type hook shape on a first surface of the insertion part and a contact part protrusively formed on a second surface of the insertion part opposite to the first surface.

* * * * *